(12) United States Patent
Lachwani et al.

(10) Patent No.: US 8,392,695 B1
(45) Date of Patent: Mar. 5, 2013

(54) RETAINING OPERATING SYSTEM CRASH INFORMATION IN VOLATILE MEMORY ACROSS A POWER CYCLE

(76) Inventors: Manish Lachwani, Sunnyvale, CA (US); David Berbessou, Sunnyvale, CA (US)

( * ) Notice: Subject to any disclaimer, the term of this patent is extended or adjusted under 35 U.S.C. 154(b) by 527 days.

(21) Appl. No.: 12/648,504

(22) Filed: Dec. 29, 2009

(51) Int. Cl.
G06F 9/24 (2006.01)
G06F 15/177 (2006.01)
(52) U.S. Cl. .......... 713/2; 713/1; 713/100; 714/14; 714/22; 714/24
(58) Field of Classification Search .......... 713/1, 2, 713/100; 714/14, 22, 24
See application file for complete search history.

(56) References Cited

U.S. PATENT DOCUMENTS 7,725,769 B1 * 5/2010 Staab .............................. 714/22
2005/0182976 A1 * 8/2005 Berkes et al. ................. 713/300

* cited by examiner

Primary Examiner — Kim Huynh
Assistant Examiner — Michael J Brown
(74) Attorney, Agent, or Firm — Lee & Hayes, PLLC

(57) ABSTRACT

Microprocessor-based devices may experience crashes due to failures in software, hardware, or a combination thereof. Details about a crash may provide valuable information for determining cause of the crash. Devices may save crash information in volatile memory, place the volatile memory into a self-refresh mode, power cycle the remainder of the device, reboot, and retrieve the crash information. Other information to be persisted across a power cycle may also be saved to volatile memory in this fashion as well.

22 Claims, 5 Drawing Sheets

RETAINING OPERATING SYSTEM CRASH INFORMATION IN VOLATILE MEMORY ACROSS A POWER CYCLE

BACKGROUND

Electronic devices such as electronic book readers ("eBook reader devices"), cellular telephones, portable media players, routers, desktop computers, servers, laptops, tablet computers, netbooks, personal digital assistants, medical devices and the like, rely on microprocessors to function.

Within these electronic devices, a microprocessor may execute instructions stored on a computer-readable storage medium to perform a variety of actions. The computer-readable storage medium may be considered "program memory" and may include volatile memory, non-volatile memory, or a combination of volatile and non-volatile memory. These instructions may include an operating system ("OS") which provides input/output functions, task scheduling, and so forth, for higher level applications which may be executing.

However, errors may occur which result in a crash, or abrupt halt, of some or all functions in the OS. Whether a crash is a result of a problem with software, hardware, or both, information about the crash may prove useful for support.

Crash information typically is stored in non-volatile memory, such as a magnetic or optical disk, non-volatile random access memory (NVRAM), and so forth to provide persistence across a power cycle. However, many devices either have no or insufficient non-volatile memory available for storing crash information. Furthermore, storage to the non-volatile memory takes significantly longer than storage to volatile memory, introducing a delay in devices which are designed to power cycle and reboot quickly. Thus, there is a need to retain OS crash information in volatile memory across a power cycle.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
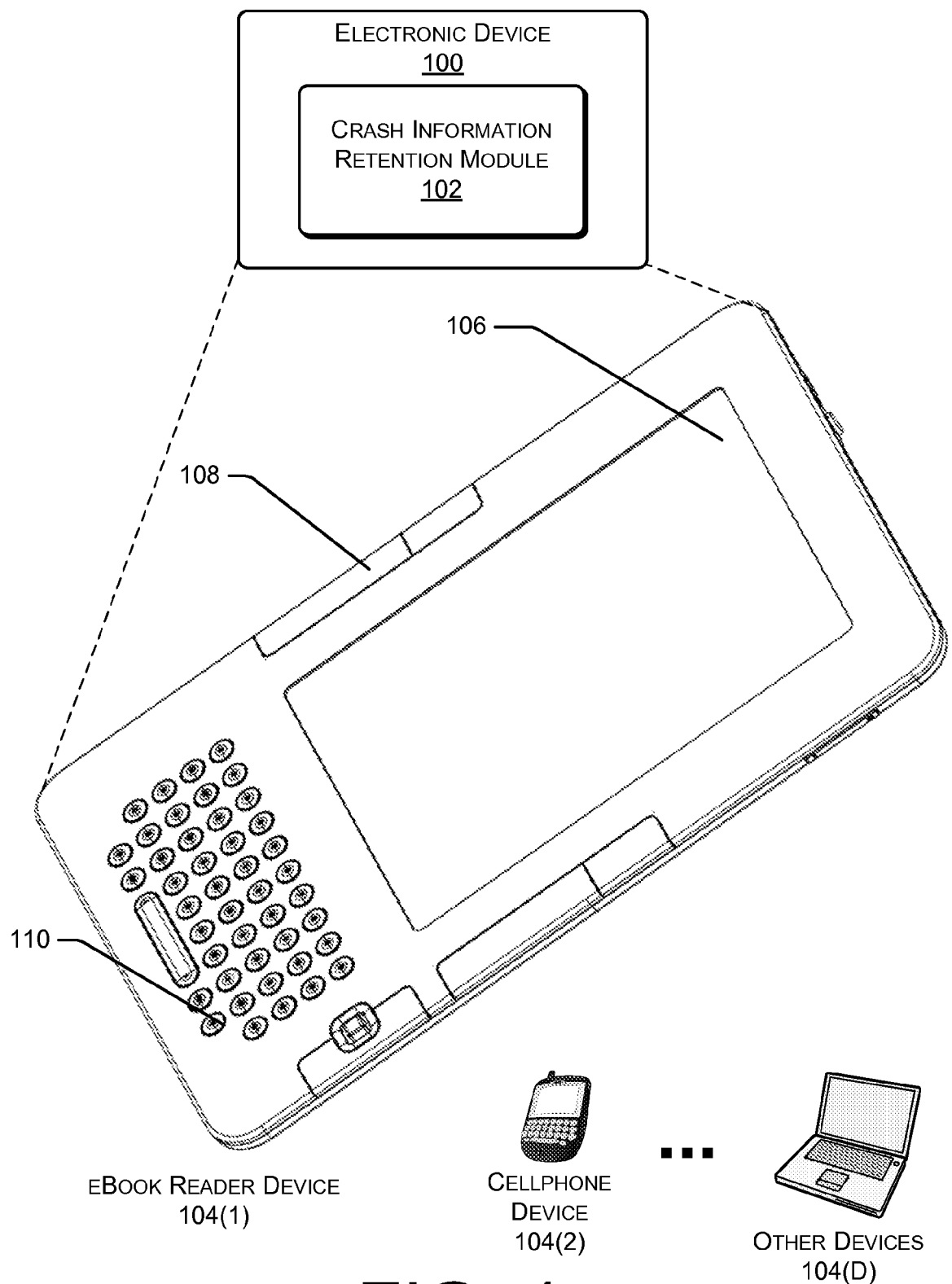
FIG. 1 is an illustrative eBook reader device configured to retain crash information across a power cycle.

As described above, electronic devices may suffer errors which result in a crash of some or all functions in the OS. The electronic devices may be embodied as electronic book reader devices ("eBook reader devices"), cellular telephones, portable media players, routers, desktop computers, servers, laptops, tablet computers, netbooks, personal digital assistants, medical devices, and the like, rely on microprocessors to function. These devices may provide the ability to access content via a network connection. For example, an eBook reader device may have a wireless network connection to allow access to content stored elsewhere and accessible by the network connection.

However, failures in the operating system ("OS"), other software executing on these microprocessors, as well as the hardware itself, may result in system crashes. Debugging information about these crashes can prove useful in determining what caused the failure. This diagnosis may in turn lead to fixes which may be provided to the electronic device, to prevent future crashes from the same or similar causes.

In some situations, while a reset of a processor to try and clear a failure is possible, this reset results in several problems which lead to a power cycle being a preferred recovery route. For example, during a processor reset, the state of peripheral devices is not cleared, which may lead to additional problems. Thus, if a fatal error results from a specific peripheral, the fatal error is likely to reoccur after a reset, resulting in a recurring failure loop.

In contrast, a power cycle of the processor and the peripheral devices clears this state information and allows a clean restart of the processor and peripherals. However, a power cycle leads to the issue of persisting information about the crash for later use. Crash information traditionally is stored in non-volatile memory, such as a magnetic or optical disk, non-volatile random access memory (NVRAM), and so forth, to provide persistence across a power cycle. However, this poses several practical problems. First, many devices including eBook reader devices, embedded devices, and so forth, either have no non-volatile memory or contain insufficient non-volatile memory for storing crash information. As a result, these devices have not been able to store crash information and retrieve that crash information after a power cycle of the processor.

Furthermore, writing of data such as crash information to non-volatile memory takes significantly longer than writing to volatile memory. For example, a write to a non-volatile memory such as flash memory may be accomplished at a data rate of 2 megabytes per second (MB/s) while a write to volatile memory such as double data rate synchronous dynamic random access memory ("DDR SDRAM") may have a data rate of 1,600 MB/s. Thus, writes to volatile memory may be at least 800 times faster than writes to non-volatile memory. Similarly, writes to non-volatile memory such as magnetic disks is even slower. Thus, the write to non-volatile memory is significantly slower and takes more time. This additional write time may introduce unwanted delays in restarting a device. For example, it may be highly desirable for a device such as a heart pacemaker or a backbone router to reboot and resume operation in the minimum possible length of time, precluding storage of crash information to slow non-volatile memory. However, without this diagnostic information, resolution of the problem becomes more difficult, even where possible.

Disclosed are techniques for retaining OS crash information in volatile memory across a power cycle. When a crash or halt occurs, the device may save crash information to a protected location in a volatile memory component such as DDR SDRAM, place the volatile memory into a self-refresh mode, power cycle the remainder of the device, reboot, and retrieve the persisted crash information from the volatile memory.

The techniques described herein may be implemented by an electronic device with volatile memory capable of self-refresh, also known as auto refresh. Self-refreshing as used in this application indicates that the volatile memory is able to have information stored therein refreshed without intervention by a central processor or memory controller, depending upon the architecture. The techniques may also be implemented by an electronic device with a power-management integrated circuit ("PMIC"). As used in this application, the PMIC or an equivalent device, which may also be known as a power management module, is configured to control power to portions of the system, initiate a warm boot mode, supply self-refresh power to volatile memory, use a real-time clock ("RTC") to trigger a wakeup, and so forth as described herein. For example, the i.MX architecture with a MC13783 PMIC from Freescale Semiconductor Incorporated, of Austin, Tex., United States of America, is one suitable family of processors and PMICs. In some implementations, the PMIC may be external to the processor, while in others the PMIC may be incorporated into the processor.

The processor executes an operating system, including, but not limited to, Linux®, UNIX®, Microsoft Corporation's Microsoft Windows®, Microsoft Corporation's Windows Mobile®, Apple Corporation's Mac OS®, Apple Corporation's Mac OS X®, and Wind River Systems Inc.'s VxWorks® operating systems.

For example, an eBook reader device may incorporate a Freescale™ processor having an i.MX architecture and executing a Linux® kernel. The kernel may use a device driver to communicate with devices such a PMIC, external memory interface ("EMI"), Universal Serial Bus ("USB") controller, image processing unit ("IPU"), and so forth. These peripheral devices may reside on the same "chip" or die as the processor as in the case of the i.MX architecture, be on another die, or a combination of the same die and another die.

While this overview describes retaining OS crash information in volatile memory across a power cycle in terms of an eBook reader device, the concepts described herein may also be applicable to cellular telephones, portable media players, desktop computers, laptops, tablet computers, routers, medical devices, servers, netbooks, servers, personal digital assistants, or other electronic devices.

Illustrative EBook Reader Device

FIG. 1 is an illustrative electronic device 100 configured to retain crash information across a power cycle by way of a crash information retention module 102. Crash information retention module 102 provides a mechanism to store and retain crash information in volatile memory across a power cycle. Crash information retention module 102 is discussed in more detail below with regards to FIG. 2. Several devices are shown in this illustration which may utilize the crash information retention module 102. For example, eBook reader device 104(1) is shown embodied as a handheld, dedicated eBook reader device. Also shown are a cellphone device 104(2) and other devices 104(D) such as a netbook computer. As used in this application, letters within parenthesis such as "(D)" indicate an integer number greater than zero.

The eBook reader device 104(1) may have a display 106 to present content in a human-readable format to a user. The display 106 may be an electrophoretic display, cholesteric display, liquid crystal display, light emitting diode display, and so forth. In some implementations, one or more displays 106 may be present. These displays may be of the same or different types. For example, one display may be an electrophoretic display while another may be a liquid crystal display.

The content presented on the display 106 may take the form of electronic books or "eBooks". For example, the display 106 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The display 106 may further include touch screen capabilities that allow user input through contact or gesturing relative to the display. For convenience only, the display 108 is shown in a generally rectangular configuration. However, it is understood that the display 106 may be implemented in any shape, and may have any ratio of height to width. Also, for stylistic or design purposes, the display 106 may be curved or otherwise non-linearly shaped. Furthermore display 106 may be flexible and configured to fold or roll.

The eBook reader device 104(1) may also incorporate one or more actuable controls 108, and a keypad 110 for user input. The one or more actuatable controls 108 may have dedicated or assigned operations. For instance, the actuatable controls 108 may include page turning buttons, a joystick, navigational keys, a power on/off button, selection keys, joystick, touchpad, and so on.

While one embodiment of electronic device 100 is shown in relation to an eBook reader device 104(1), it is understood that electronic device may include cellular telephones 104(2), and other devices 104(D) such as portable media players, desktop computers, laptops, tablet computers, netbooks, personal digital assistants, servers, medical devices, and the like.

Figure 2:
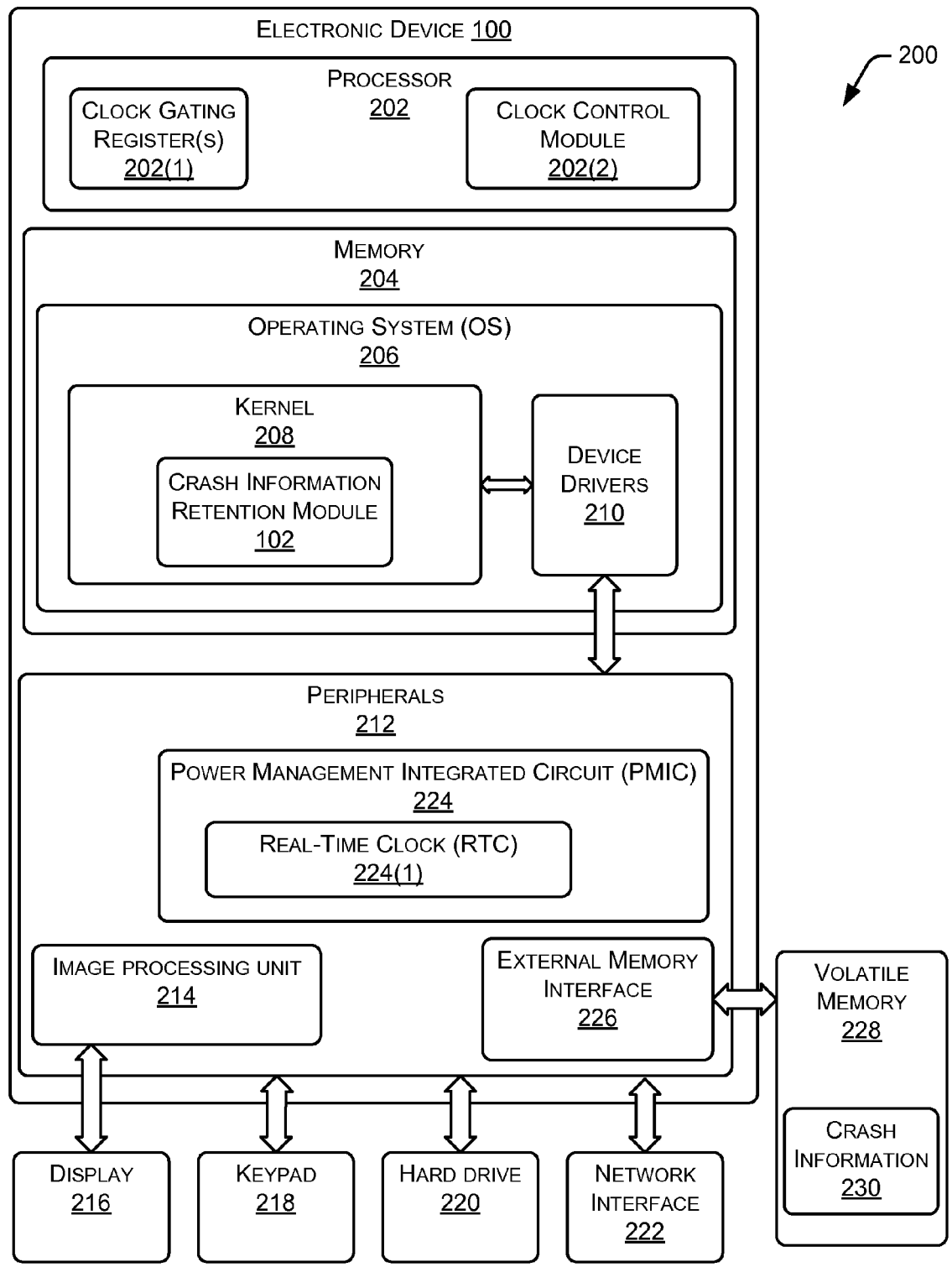
FIG. 2 is an illustrative schematic of an electronic device configured to retain crash information across a power cycle.

FIG. 2 illustrates selected functional components 200 that might be implemented in the electronic device 100. In a very basic configuration, the device 100 includes components such as a processor 202 and a memory 204. Each processor 202 may itself comprise one or more processors. In some implementations there may be a plurality of processors 202. Processor 202 may include one or more clock gating registers ("CGRs") 202(1) and a clock control module ("CCM") 202 (2). CGRs 202(1) include clocks which are to be gated when the processor 202 enters a doze mode. CCM 202(2) provides device-level clock gating within the electronic device 100. For example, the CCM 202(2) may be used to bring a device such as the processor 202 into a low power doze mode and gate processor clocks.

Depending on the configuration of a device 100, the memory 204 may be an example of computer readable storage media and may include volatile and nonvolatile memory. Thus, the memory 204 may include, but is not limited to, RAM, ROM, EEPROM, flash memory, or other memory technology, or any other medium which can be used to store media items or applications and data which can be accessed by the device 100.

The memory 204 may be used to store any number of functional components that are executable on the processing unit 202, as well as data including content items such as eBooks. Thus, memory 204 may store an operating system 206 comprising a kernel 208 operatively coupled to one or more device drivers 210. Within kernel 208 may be the crash information retention module 102, as introduced with respect to FIG. 1. In some implementations, the crash information retention module 102 may be external to the kernel 208. Device driver 210 is operatively coupled to peripheral devices ("peripherals") 212. Several illustrative peripherals in electronic device 100 are described next.

An image processing unit 214 is shown coupled to one or more displays 216. For example, this display 216 may be display 106 on eBook reader device 104(1) described above.

In some implementations, multiple displays may be present and coupled to the image processing unit 214. In some implementations, one or more image processing units 214 may coupled to the multiple displays.

Electronic device 100 may have a keypad 218, which may be the same, for example, as the keypad 110 on eBook reader device 104(1) described above having user actuable controls 108. Also shown is hard drive 220, which may either use magnetic or optical memory on spinning disks or solid state storage.

A network interface 222 may also be coupled to electronic device 100. Network interface 222 may allow for connection to wired or wireless local or wide area networks.

A power management integrated circuit ("PMIC") 224 is configured to control power distribution to devices in electronic device 100. For example, PMIC 224 may be configured to cut power to and from various devices, such as the processor 202, hard drive 220, and so forth. PMIC 224 may also control the level of power provided, such as power for awake operations as well as reduced power levels for low power doze modes.

An External Memory Interface ("EMI") 226 is also shown coupled to volatile memory 228. The EMI 226 manages access to data stored in memory, such as volatile memory 228. Volatile memory 228 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), and so forth. Memory is deemed volatile when the memory loses stored information upon removal of electrical power for a substantial period of time (e.g, milliseconds to minutes). In some implementations, EMI 226 may also be coupled to non-volatile memory such as flash memory NAND flash, and so forth.

Stored within volatile memory 228 is crash information 230. This crash information is data which is to be persisted across a power cycle. Crash information 230 may be stored in reserved memory pages for later retrieval. Crash information 230 and the reservation of memory pages in volatile memory 228 are described in more detail below with regards to FIG. 3.

Other peripherals may be present in the electronic device 100. These other devices may include a firewire bus, camera, global positioning system, Bluetooth™ wireless interface, PC Card component, and so forth.

Couplings, such as that between kernel 208 and device driver 210, are shown for emphasis. There are couplings between many of the components illustrated in FIG. 2, but graphical arrows are omitted for clarity of illustration.

Figure 3:
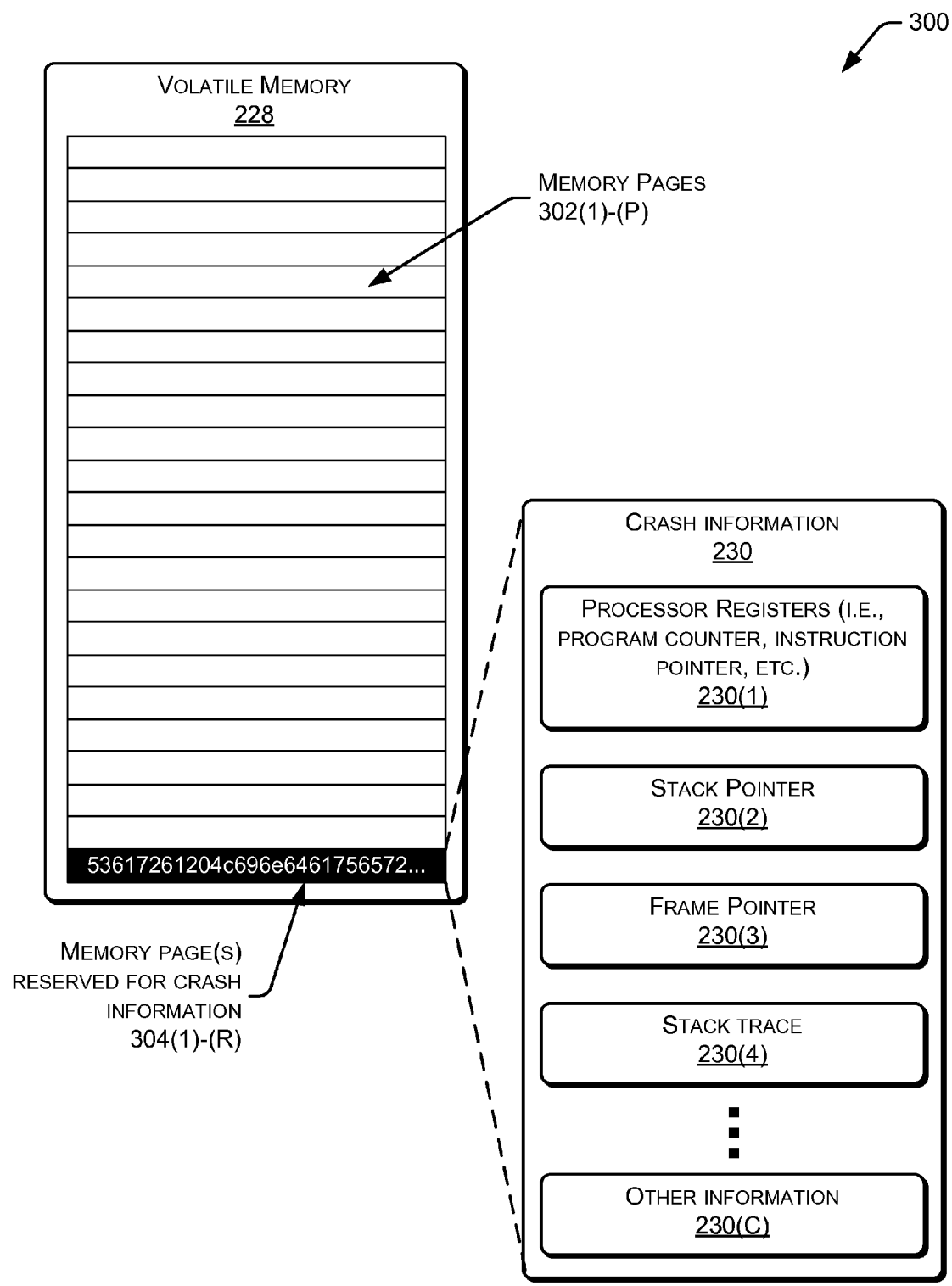
FIG. 3 is an illustration of exemplary volatile memory and crash information stored therein.

FIG. 3 is an illustration 300 of exemplary volatile memory 228 and crash information 230 stored therein. In this illustration, a diagram of memory locations such as pages 302(1), . . . , 302(P) within volatile memory 228 is depicted. The number of memory pages 302(P) present in volatile memory 228 is a function of the size of volatile memory 228 and the page size in use. In some implementations, memory pages 302(P) may vary in size or configuration from one another.

As shown in this illustration, one or more memory pages 304(1), . . . , 304(R) are reserved for storing crash information. In some implementations, specific memory page locations may be reserved for storing crash information. For example, where a single memory page 304(1) is reserved for crash information 230, the last memory page 302(P) in volatile memory 228 may reserved. In other implementations, other memory pages may be reserved for storing crash information. For example, a first memory page, or any other specified addressable memory page, may be used to store the crash information 230.

Upon reboot, the OS 206 probes this reserved location for crash information 230. The crash information 230 found in the reserved location may then be stored in nonvolatile memory such as on a hard drive 220, forwarded to a support center via network interface 222, and so forth.

Crash information 230 may comprise several pieces of information useful for debugging, troubleshooting, support, and so forth. Crash information 230 may comprise contents of the processor registers 230(1) at the time of a crash. For example, on a general purpose ARM® compliant-microprocessor (such as licensed or provided from ARM Holdings of Cambridge, England), this would include registers R0 through R15. These processor registers may include a program counter/instruction pointer. The program counter or instruction pointer indicates where the processor is in an instruction sequence. Thus, knowing the program counter at the time of a crash is useful to know what instruction was being executed, or which instruction is next to be executed, depending upon the architecture of the electronic device 100.

A stack pointer 230(2) may also be stored as part of crash information 230. The stack pointer 230(2) indicates the current top of a call stack (also known as an execution stack or run-time stack) during processing. The call stack stores information about what instructions are active for execution by the processor.

A frame pointer 230(3) may be stored, indicating what frame is being accessed. In some implementations, the frame pointer 230(3) points to a fixed point in the user stack, such as where arguments and local variables for a called function are located.

Crash information 230 may also include a stack trace 230(4), which may also be known as a backtrace. A stack trace lists active stack frames at a given time during execution of instructions on the processor 202. The stack trace 230(4) is useful in showing a location where an error occurred in a piece of code.

Other information 230(C) may also be stored in the crash information 230. Such other information 230(C) may vary with the particular hardware architecture, programming languages employed, general nature of crashes, and so forth of electronic device 100.

In some implementations, information other than crash information 230 may be persisted across a power cycle. For example, application state, user data, state information of specified peripherals, and so forth, may be saved and persisted across the power cycle as desired.

Illustrative Process for Retaining Crash Information

Figure 4:
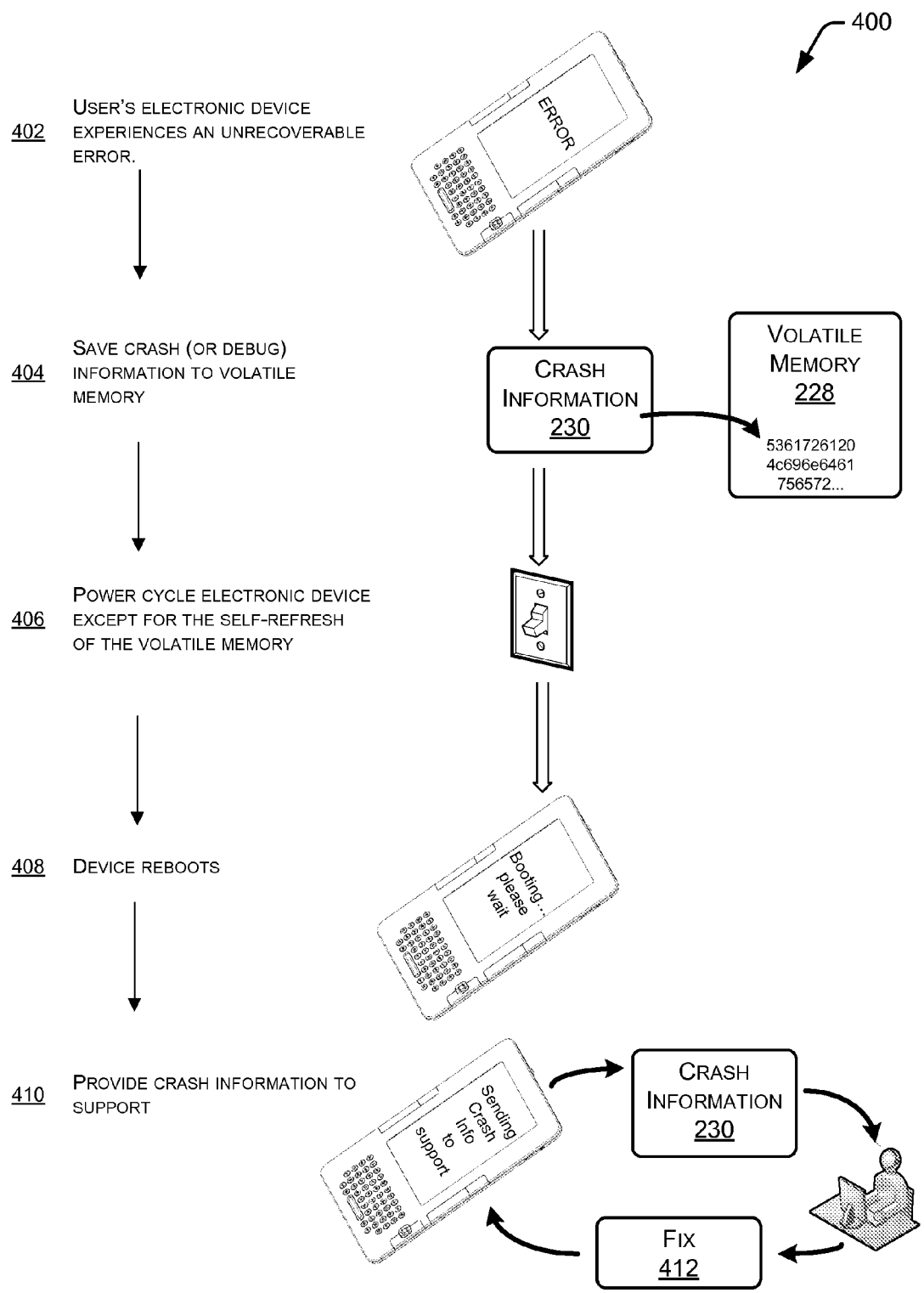
FIG. 4 is an illustrative process for retaining crash information in volatile memory across a power cycle in an eBook reader device.
Figure 5:
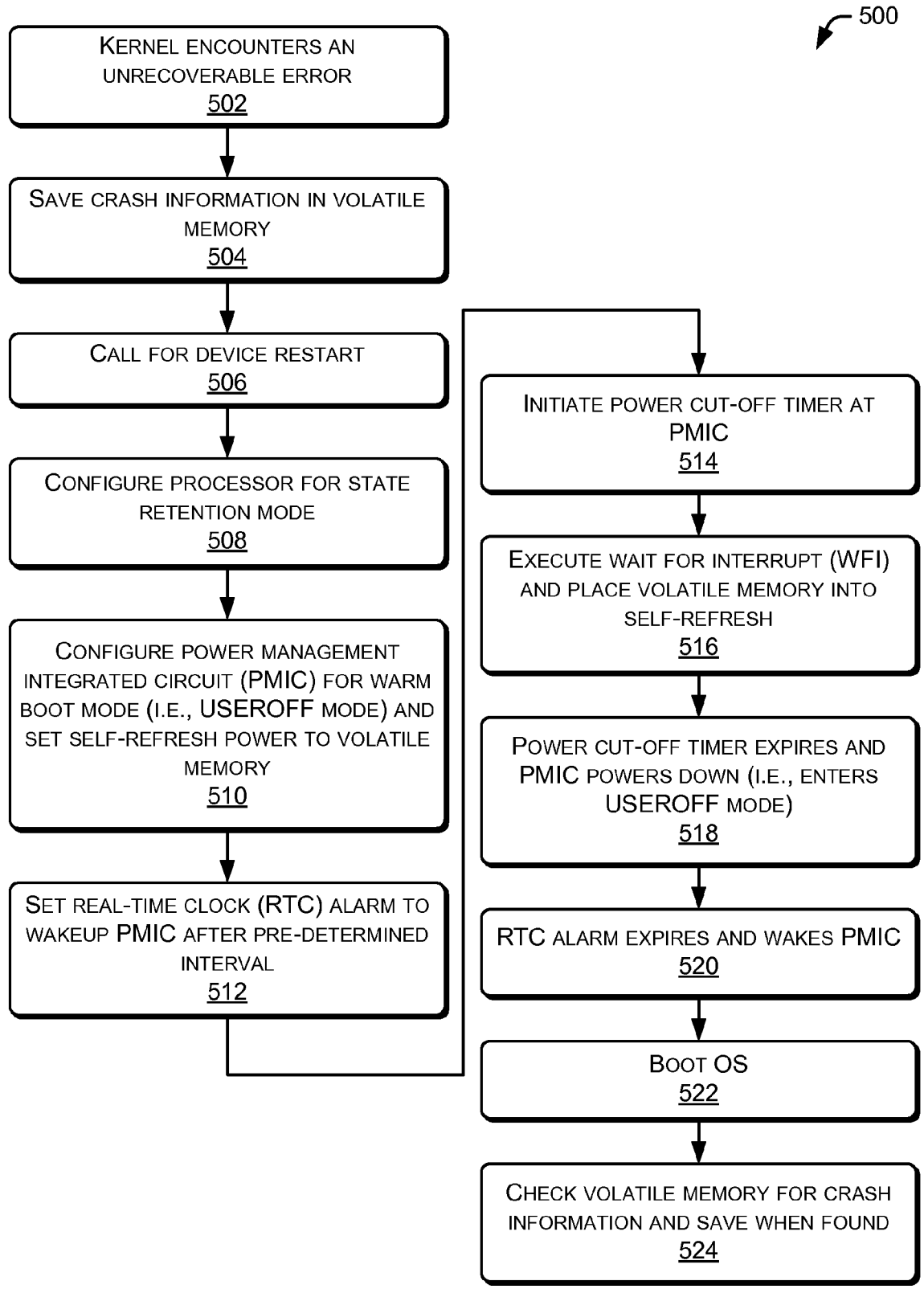
FIG. 5 is an illustrative flow diagram of a process for retaining crash information in volatile memory across a power cycle.

FIGS. 4-5 illustrate example processes 400 and 500 that may be implemented by the architecture of FIGS. 1-3 or by other architectures. These processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. For ease of discussion, but not by way of limitation, the following figures include references to functions, commands, and/or other elements found in the Linux® operating system executing on an ARM®-based processor. It is understood that the following processes may be implemented on other operating systems as well as other processor architectures.

FIG. 4 is an illustrative process 400 for retaining crash information in volatile memory across a power cycle in the eBook reader device 104(1) of FIG. 1. In this illustration, at 402, the user's device 104(1) has experienced an unrecoverable error, such as a crash of the OS running on their eBook reader device 104(1) or other fatal error. This fatal error is severe enough that the OS cannot safely recover from the error. For example, the OS may have attempted to read an invalid or non-permitted memory address. As mentioned above, the following examples are described in terms of the Linux® OS executing on an ARM®-based architecture, however it is understood that other OS's and architectures may also be used.

A fatal error may result in a kernel panic, which invokes the panic( ) routine in the kernel. The panic( ) may result in an "OOPS," which is a deviation from correct behavior of the kernel which produces an error log. When the kernel detects a problem, an OOPS message may be generated and offending processes may be killed. Once an OOPS has occurred, some internal resources may no longer be in service. Even though the eBook reader device 104(1) may appear to continue to function correctly, undesirable side effects may result from the killing of processes. Thus, a kernel OOPS often leads to a kernel panic when there is an attempt to use a resource which has been lost or killed.

Traditionally, a panic results in a dump of crash information to a console. However, when no console is available (such as on an eBook reader device) the crash information which has not been stored quickly becomes inaccessible to a support engineer or other support entity attempting to diagnose the cause of the crash.

To address this problem, at 404, crash information 230 is saved to the volatile memory 228. By saving to volatile memory 228, a write of the crash information in minimal time is achieved. As described in more detail below with regard to FIG. 5, at 406, a power cycle for the eBook reader device 104(1) is triggered. However, the volatile memory 228 is maintained in a self-fresh mode during this power cycling, preserving memory contents during the power cycle.

At 408, the eBook reader device 104(1) reboots and resumes function. At 410, the eBook reader device 104(1) may access the crash information 230 and provide the crash information 230 to a support resource such as a technician or automated diagnostic system. This crash information 230 may be delivered to the support resource via the network interface 222, or via connection with an external device such as a host computer, diagnostic terminal, portable memory device, and so forth. In some implementations, the support resource may then return a fix 412, such as a kernel patch, updated driver, and so forth to eBook reader device 104(1). Should there be any further OS crashes, the process may repeat. Eventually, the incidence of crashes would be expected to decrease, given the timely and detailed crash information provided to the support resource in combination with the deployment of fixes.

FIG. 5 is an illustrative flow diagram of a process 500 for retaining crash information in volatile memory across a power cycle. At 502, a kernel 208 encounters an unrecoverable error or other fatal error. For example, inappropriate memory access may result in a fatal error. At 504, information to be persisted across a power cycle, such as crash information 230, is saved in volatile memory 228 such as DDR SDRAM. At 506, a call is made for a restart of the electronic device 100. As noted above, such a restart may clear the state of the processor 202 and peripherals 212. At 508, the processor 202 is configured for a state retention mode. For example, a low power mode bit in a clock control module CCM 202(2) register may be set to enable state retention mode.

At 510, a power management module such as a PMIC 224 is configured for a warm boot mode, and power is set to be provided to the volatile memory to provide power for self-refresh. The term "warm boot" indicates that the reset pin on the processor will be triggered, while a "cold boot" indicates that power to the processor and all peripherals will be discontinued.

As described herein, power to the processor 202 and peripherals 212, except for volatile memory 228 and elements of the PMIC 224, is discontinued. For ease of discussion, this may be considered a "cool boot," where power is mostly but not completely discontinued. For example, with the Freescale architecture, the MC13783 PMIC may be configured for the warm boot mode of a USEROFF power cut-off mode. In this mode, all switchers and regulators are off except for VBKUP1 and VBKUP2. The VBKUP2 regulator may be set to 1.8V to provide power for the volatile memory 228 to operate in self-refresh mode. In other implementations and architectures, other regulators, switchers, and voltages may be used.

At 512, a real-time clock ("RTC") is configured to awaken the PMIC after a pre-determined off interval. For example, the RTC may be configured to awaken the PMIC 224 after about five seconds. This pre-determined off interval may be adjusted statically or dynamically to account for factors, including the time required for the processor, peripherals, or both, to stabilize after a power cut.

At 514, the power cut-off timer of the PMIC 224 is initiated. For example, this may occur when the MC13783 PMIC is pushed into the USEROFF mode. A power cut-off time interval may be statically or dynamically defined. In one implementation, such as the mx31 architecture, the interval is about 8 milliseconds. At this point, the processor has the amount of time specified by the power-cut off time interval to complete operations before power cut.

At 516, the processor 202 executes a wait for interrupt ("WFI") and places the volatile memory 228 into a self-refresh mode. It is advantageous in some implementations to place the volatile memory 228 into the self-refresh mode after the initiation of the power cut because, at that point in the process, the processor 202 and peripherals 212 are no longer accessing the volatile memory 228. Such access to volatile memory 228 after primary power has been removed from the volatile memory 228 may result in power demands exceeding available power while in self-refresh mode, resulting in a malfunction.

In some implementations, volatile memory 228 containing the information to be persisted across the power cycle may be placed into self-refresh mode, while other volatile memory is not placed into self-refresh mode. For example, where the architecture permits, crash information 230 may be stored in a first memory chip which is placed into self-refresh mode to persist that data, while other memory chips are not placed into self-refresh mode and consequently lose data stored therein as a result of the power cut.

At 518, the power cut-off timer expires at the end of the pre-determined power cut-off time interval and the PMIC powers down. This powering down results in the PMIC 224 providing power for the self-refresh mode while discontinuing power to some or all connected loads, such as the processor 202, attached peripherals 212, and so forth. For example, the PMIC may enter the USEROFF cut mode. At this point, the electronic device 100 is powered down. The processor 202 and peripherals 212 except for those for which power was maintained such as the volatile memory 228, are off. The crash information 230 is stored in the reserved location 304 of the volatile memory, awaiting retrieval upon reboot.

At 520, the RTC alarm expires and wakes the PMIC 224, which in turn initiates a power up of the processor 202. At 522, the awakened electronic device 100 boots and resumes operation. At 524, the kernel 208 checks the reserved memory location 304 to determine when persisted data, such as crash information 230, is present. When persisted information is present, the information may be stored in non-volatile memory (when non-volatile memory is available), sent to an external device such as a diagnostic server via a network, or both. For example, crash information 230 may be sent via the network interface 222 to support personnel and used for diagnostic analysis to determine the problem which led to the kernel 208 fault. Finally, once the crash information 230 has been stored or sent, in some implementations the reserved memory location 304 may be initialized.

Source code in the C language for one implementation of maintaining OS crash information in volatile memory across a power cycle follows. This code is provided as an example, not as a limitation.

Example Code 1

```
/* Kernel panic( ) invokes BUG( ). */
NORET_TYPE void panic (const char * fmt, . . . )
.
.
.
BUG( ); /* Go through the default oops saving scheme */
```

Example Code 2

```
/* BUG( ) invokes_bug( ). */
_bug( ) causes the kernel to oops by accessing memory at address 0.
void_attribute_((noreturn))_bug (const char *file, int line)
.
.
.
(int *)0=0;
```

Example Code 3

```
/* Once memory at location 0 is accessed, there is a protection fault and the handler calls_die( ). _die( ) inserts the string "OOPS" at the SDRAM reserved location to mark a start of the crash information. */
static void_die (const char *str, int err, struct thread_info *thread, struct pt_regs *regs)
.
.
.
die_buffer[0]='O';
die_len++;
die_start++;
die_buffer[1]='O';
die_len++;
die_start++;
die_buffer[2]='P';
die_len++;
die_start++;
die_buffer[3]='S';
die_len++;
die_start++;
```

Example Code 4

```
/* The kernel printk( ) function is modified to call insert_oops_chars( ). Once a crash occurs, the printk( ) function will dump all the information directed to the console into the SDRAM location. */
void insert_oops_chars (char c)
{
if (!die_oops_enable)
   return;
die_buffer[die_len]=c;
die_len++;
}
EXPORT_SYMBOL (insert_oops_chars);
As can be seen, the die_buffer is a pointer to the SDRAM location.
Oops_start=OOPS_SAVE_BASE;
void *die_oops_start=oops_start;
memcpy ((void *) die_oops_start, (void *) die_buffer, OOPS_SAVE_SIZE);
```

Example Code 5

```
/* The mxc_check_oops( ) function checks if there is a crash information to be retrieved. */
int __ init mxc__ check__oops(void)
{
        unsigned long oops_ddr_start = OOPS_SAVE_BASE;
        char oops_buffer[QQQ1004];
        oops_start = _arm_ioremap(oops_ddr_start, OOPS_SAVE_SIZE, 0);
        memcpy((void *)oops_buffer, oops_start, QQQ1003);
        if ( ( (oops_buffer[0] == 'O') && (oops_buffer[1] == 'O') &&
                (oops_buffer[2] == 'P') && (oops_buffer[3] == 'S') ) {
                printk ("Kernel Crash Start\n");
                printk ("%s", oops_buffer);
                memcpy((void *)oops_buffer, (oops_start + QQQ1004), QQQ1003);
                printk ("%s", oops_buffer);
                memcpy((void *)oops_buffer, (oops_start + 2048), QQQ1003);
                printk ("%s", oops_buffer);
                memcpy((void *)oops_buffer, (oops_start + 3072), QQQ1003);
                printk ("%s", oops_buffer);
                printk ("\nKernel Crash End\n");
        }
        memset(oops_start, 0, OOPS_SAVE_SIZE);
        return 1;
}
late_initcall(mxc_check_oops);
```

Example Code 6

```
/* The arch_reset( ) function that configures the PMIC RTC alarm and invokes power cut off. */
struct timeval pmic_time;
pmic_rtc_get_time (&pmic_time);
pmic_time.tv_sec+=5;
pmic_rtc_set_time_alarm (&pmic_time);
//Clear TODAI interrupt flag
pmic_write_reg  (REG_INTERRUPT_STATUS_1, 0, 0x2);
//Unmask TODAM interrupt
pmic_write_reg (REG_INTERRUPT_MASK_1, 0, 0x2);
mx31_deep_reset( )
```

Example Code 7

```
/* The pmic_power_off ( ) is invoked and SDRAM is put
into self refresh. */
/*
* mx31 reset Atlas but keep the backup regulators ON
*/
static void mx31_deep_reset (void)
{
t_pc_config pc_config;
unsigned int reg;
pc_config.auto_en_vbkup2=0;
pc_config.en_vbkup2=0;
pc_config.vhold_voltage=3;
pc_config.vhold_voltage2=3;
pc_config.auto_en_vbkup1=1;
pc_config.en_vbkup1=0;
pc_config.warm_enable=0;
pc_config.pc_enable=1;
pc_config.pc_timer=3;
pc_config.pc_count_enable=1;
pc_config.pc_count=0;
pc_config.pc_max_count=7;
pc_config.user_off_pc=1;
pmic_power_set_pc_config (&pc_config);
udelay (1000);
reg=_raw_readl (MXC_CCM_CCMR);
reg=(reg & (~MXC_CCM_CCMR_LPM_MASK))|
    2<<MXC_CCM_CCMR_LPM_OFFSET|
    MXC_CCM_CCMR_VSTBY;
_raw writel (reg, MXC_CCM_CCMR);
pmic_power_off( );/* Trigger power off−starts 8 ms timer
   */
local_irq_disable( );
_asm_ _volatile_("mcr p15, 0, r1, c7, c0, 4\n"
   "nop\n" "nop\n" "nop\n"
   "nop\n" "nop\n"::);
while (1) {
   /* do nothing */
}
}
```

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method of retaining crash information in volatile memory across a power cycle, the method comprising:
   writing crash information to a reserved location in the volatile memory;
   configuring a power management integrated circuit to provide self-refresh power to the volatile memory;
   setting a real-time clock alarm to awaken the power management integrated circuit after a pre-determined off interval;
   initiating a power cut-off timer;
   executing a wait-for interrupt;
   placing the volatile memory into a self-refresh mode;
   after the power cut-off timer expires, powering down the power management integrated circuit except for the self-refresh power to the volatile memory;
   awakening the power management integrated circuit upon expiration of the pre-determined off interval; and
   retrieving the crash information stored in the reserved location.

2. The method of claim 1, wherein the volatile memory comprises double data rate synchronous dynamic random access memory.

3. The method of claim 1, further comprising booting an operating system upon awakening.

4. The method of claim 1, wherein the crash information further comprises at least one of:
   a program counter value;
   an instruction pointer value;
   a stack pointer value;
   a frame pointer value; or
   a stack trace.

5. The method of claim 1, further comprising sending the retrieved crash information for diagnostic analysis.

6. A system comprising:
   a volatile memory;
   a program memory;
   a processor coupled to the volatile memory and the program memory;
   a power management module coupled to the processor and the volatile memory and configured to provide self-refresh power to the volatile memory;
   a real-time clock coupled to the power management module;
   a plurality of instructions stored in the program memory and configured to execute on the processor, the instructions being configured to:
   write data to the volatile memory;
   configure the real-time clock to awaken the power management module after a pre-determined off interval;
   initiate a power cut-off timer;
   place the volatile memory into a self-refresh mode;
   after the power cut-off timer expires, set the power management module to provide the self-refresh power to the volatile memory while discontinuing power to other connected loads; and
   awaken the power management module upon expiration of the pre-determined off interval.

7. The system of claim 6, wherein the plurality of instructions is further configured to execute a wait-for interrupt instruction on the processor after initiating the power cut-off timer.

8. The system of claim 6, wherein the plurality of instructions comprises a kernel.

9. The system of claim 6, wherein the plurality of instructions is further configured to retrieve the data from the volatile memory.

10. The system of claim 6, wherein the plurality of instructions is further configured store the data in a reserved location within the volatile memory.

11. The system of claim 6, wherein the data comprises crash information associated with a kernel fault.

12. The system of claim 6, wherein the plurality of instructions is further configured to check volatile memory for data after awakening.

13. The system of claim 6, further comprising:
   a network interface coupled to the processor; and
   wherein the plurality of instructions is further configured to initiate a transfer via the network interface of the data stored in the volatile memory to another device.

14. The system of claim 6, embodied as an electronic book reader device.

15. One or more non-transitory computer-readable storage media storing instructions that, when executed by one or more processors, cause the one or more processors to perform acts comprising:
- writing information to be persisted to a volatile memory accessible by the one or more processors;
- awakening a power management module upon expiration of a pre-determined off interval;
- concurrently power cycling the one or more processors and components coupled to the one or more processors while the power management module maintains the volatile memory storing the information to be persisted; and
- restarting the power-cycled components.

16. The one or more non-transitory computer-readable media of claim 15, wherein the power management module maintains the volatile memory by placing the volatile memory into a self-refresh mode and providing power to the volatile memory during power cycling of the other components.

17. The one or more non-transitory computer-readable media of claim 15, wherein the power management module maintains the volatile memory by refreshing the volatile memory storing the information to be persisted.

18. The one or more non-transitory computer-readable media of claim 17, wherein volatile memory other than that used for the information to be persisted remains unrefreshed.

19. The one or more non-transitory computer-readable media of claim 15, further comprising accessing the information stored in the volatile memory.

20. The one or more non-transitory computer-readable media of claim 19, further comprising storing the accessed information in a non-volatile memory after restarting.

21. The one or more non-transitory computer-readable media of claim 15, wherein the power cycling comprises:
- setting a real-time clock alarm to awaken the power-cycled components after a pre-determined off interval;
- initiating a power cut-off timer;
- executing a wait-for interrupt; and
- when the power cut-off timer expires, powering down the one or more processors and components coupled thereto while retaining power to the volatile memory.

22. The one or more non-transitory computer-readable media of claim 15, further comprising setting a real-time clock alarm to awaken the power management module after the pre-determined off interval.

* * * * *